(12) United States Patent
Son et al.

(10) Patent No.: US 9,239,617 B2
(45) Date of Patent: Jan. 19, 2016

(54) APPARATUS AND METHOD OF CONTROLLING MOBILE TERMINAL BASED ON ANALYSIS OF USER'S FACE

(71) Applicant: Samsung Electronics Co., Ltd., Gyeonggi-do (KR)

(72) Inventors: Byung-Jun Son, Seoul (KR); Hong-Il Kim, Gyeonggi-do (KR); Tae-Hwa Hong, Seoul (KR)

(73) Assignee: Samsung Electronics Co., Ltd (KR)

( * ) Notice: Subject to any disclaimer, the term of this patent is extended or adjusted under 35 U.S.C. 154(b) by 296 days.

(21) Appl. No.: 13/875,864

(22) Filed: May 2, 2013

(65) Prior Publication Data

US 2013/0293456 A1 Nov. 7, 2013

(30) Foreign Application Priority Data

May 2, 2012 (KR) .................. 10-2012-0046548
Apr. 25, 2013 (KR) .................. 10-2013-0046000

(51) Int. Cl.
*G06F 3/01* (2006.01)
*G06K 9/00* (2006.01)

(52) U.S. Cl.
CPC ................ *G06F 3/013* (2013.01); *G06F 3/012* (2013.01); *G06K 9/00248* (2013.01); *G06K 9/00261* (2013.01); *G06K 9/00288* (2013.01)

(58) Field of Classification Search
CPC ..... G06F 3/013; G06F 3/012; G06K 9/00261; G06K 9/00248; G06K 9/00288
USPC .................... 345/156, 158; 715/863; 382/103
See application file for complete search history.

(56) References Cited

U.S. PATENT DOCUMENTS

| 8,036,460 | B2 | 10/2011 | Nanu et al. |
| 8,244,068 | B2 | 8/2012 | Thorn |
| 8,509,541 | B2 * | 8/2013 | Tallamraju et al. G06K 9/00597 382/181 |
| 8,594,372 | B2 * | 11/2013 | Hsu ..................... G04G 13/025 382/103 |
| 2009/0175509 | A1 | 7/2009 | Gonion et al. |
| 2009/0219224 | A1 | 9/2009 | Elg |
| 2009/0239579 | A1 | 9/2009 | Lee et al. |
| 2009/0258667 | A1 | 10/2009 | Suzuki et al. |
| 2010/0046766 | A1 | 2/2010 | Gregg et al. |
| 2010/0097227 | A1 | 4/2010 | Kim et al. |
| 2010/0125816 | A1 * | 5/2010 | Bezos ................... G06F 1/1626 715/863 |
| 2010/0183218 | A1 * | 7/2010 | Naito et al. ........ G06K 9/00281 382/159 |

(Continued)

FOREIGN PATENT DOCUMENTS

| JP | 2008-181439 | 8/2008 |
| KR | 1020090101733 | 9/2009 |
| KR | 1020090125207 | 12/2009 |

*Primary Examiner* — Aneeta Yodichkas
*Assistant Examiner* — Chineyere Wills-Burns
(74) *Attorney, Agent, or Firm* — The Farrell Law Firm, P.C.

(57) ABSTRACT

An apparatus and method of controlling a mobile terminal by detecting a face or an eye in an input image are provided. The method includes performing face recognition on an input image facing and being captured by an image input unit equipped on the front face of the mobile terminal; determining, based on the face recognition, user state information that includes whether a user exists, a direction of the user's face, a distance from the mobile terminal, and/or a position of the user's face; and performing a predetermined function of the mobile terminal according to the user state information. According to the method, functions of the mobile terminal may be controlled without direct inputs from the user.

24 Claims, 16 Drawing Sheets

(56) References Cited

U.S. PATENT DOCUMENTS

2011/0151934 A1 6/2011 Geng
2013/0057573 A1* 3/2013 Chakravarthula et al. .............. G06F 3/005
                                                                345/619

* cited by examiner

APPARATUS AND METHOD OF CONTROLLING MOBILE TERMINAL BASED ON ANALYSIS OF USER'S FACE

PRIORITY

This application claims priority under 35 U.S.C. §119(a) to Korean Patent Applications filed in the Korean Intellectual Property Office on May 2, 2012 and assigned Serial No. 10-2012-0046548, and on Apr. 25, 2013 and assigned Serial No. 10-2013-0046000, the entire disclosures of which are incorporated herein by reference.

BACKGROUND OF THE INVENTION

1. Field of the Invention

The present invention relates generally to an image processing apparatus and method, and more particularly, to an apparatus and method of controlling a mobile terminal based on analysis of a user's face in an input image.

2. Description of the Related Art

Mobile terminals have increasingly expanded their services and additional functions, among which a camera function is considered a key function. To increase usefulness of the mobile terminal and satisfy different desires of users, combinations of the mobile terminal having a camera with their services and additional functions are required. As an example of the combinations, there is a technology to recognize faces from images inputted through the camera. The face recognition technology has been found to be very important in many application fields, such as expression studies, driver's drowsiness detection, or identification check.

Among the face recognition technologies, there is one method where three or more of features, such as a face, eyes, a mouth, a jaw, eye brows, a facial contour, etc., are identified in an image captured from the camera, a rotational direction of the image is determined with respect to a reference direction, and the image is displayed in the determined rotational direction. In addition, there is a technology to display information by recognizing the user's facial contour and positions of his/her eyes, jaw, and mouth, calculating a rotation angle of a line that links both eyes, and determining a display direction of the information. In this regard, the face recognition procedure requires detecting correct positions of many facial components or features in the image, such as the face, eyes, mouth, jaw, etc.

As such, since most conventional technologies are based on detection of the user's face together with at least one facial component, such as the eyes, mouth, jaw, etc., they may not obtain normal face recognition results nor correctly perform functions corresponding to the face recognition results from an image having a face being obscured by any other object or having only a part of the face being captured due to a particular viewing angle.

Furthermore, for a face recognition technology, a correct eye detection technique needs to be done for correct face recognition. However, conventional technologies only focus on detection of eye positions in a face image and do not consider the situation where the face detection has failed. Thus, a need exists for correctly detecting the eye positions even in the situation where the face detection has failed.

Furthermore, in order for a user to perform a desired operation of the mobile terminal, hardware interfaces, such as keypads or touchscreens have to be used. If it is possible for the mobile terminal to be controlled through eye detection without direct inputs from the user, it guarantees better quality of user experience.

SUMMARY OF THE INVENTION

The present invention has been made to address at least the problems and disadvantages described above and to provide at least the advantages described below. Accordingly, an aspect of the present invention provides an apparatus and method of controlling a mobile terminal by detecting a face or an eye in an input image without direct input from a user.

An aspect of the present invention also provides an apparatus and method of controlling a mobile terminal through eye detection even if faces are not detected in an input image.

Another aspect of the present invention provides an apparatus and method of performing face detection even on a partial face in an input image.

In accordance with an aspect of the present invention, an apparatus for controlling a mobile terminal based on analysis of a user's face is provided, the apparatus including an image input unit; an image processor configured to perform, upon reception of an input image through the image input unit, face detection or eye detection on the input image; and a controller configured to determine user state information based on face recognition results or eye recognition results from the image processor, and control to perform a predetermined function of the mobile terminal according to the user state information.

In accordance with another aspect of the present invention, a method of controlling a function based on analysis of a user's face in a mobile terminal is provided, the method including driving, upon occurrence of a predetermined event, an image input unit; performing, upon reception of an input image through the image input unit, face detection on the input image; performing eye detection on the input image if the face detection fails; determining user state information based on face recognition results or eye recognition results; and performing a predetermined function of the mobile terminal according to the user state information.

BRIEF DESCRIPTION OF THE DRAWINGS

The above and other features and advantages of the present invention will become more apparent by describing in detail embodiments thereof with reference to the attached drawings in which.

DETAILED DESCRIPTION OF EMBODIMENTS OF THE PRESENT INVENTION

Figure 1:
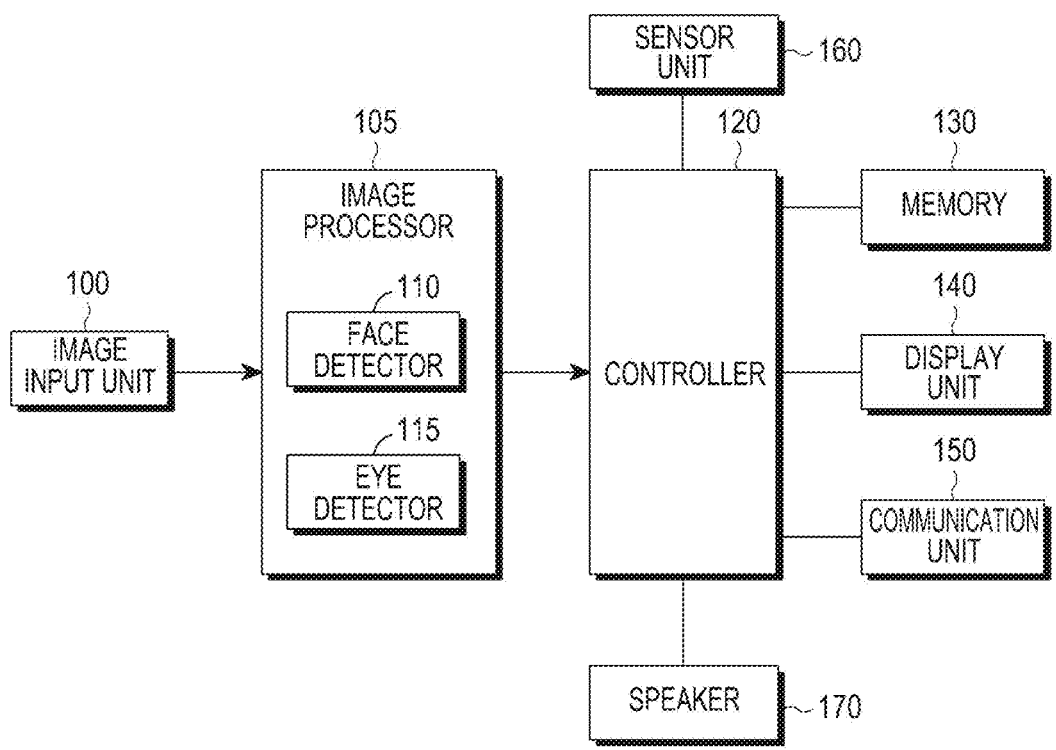
FIG. 1 is a block diagram of a mobile terminal, according to an embodiment of the present invention.

Reference will now be made in detail to embodiments of the present invention, examples of which are illustrated in the accompanying drawings, wherein like reference numerals refer to the like elements throughout. In this regard, the embodiments of the present invention may have different forms and should not be construed as being limited to the descriptions set forth herein. Accordingly, the embodiments are merely described below, by referring to the figures, to explain aspects of the present invention.

The present invention provides a method of controlling a mobile terminal by detecting a face or an eye in an input image. The method includes performing face recognition on an input image facing and being captured by an image input unit equipped on a front face of the mobile terminal; determining, based on the face recognition, user state information that includes whether a user exists, a direction of the user's face, a distance from the mobile terminal, and/or a position of the user's face; and performing a predetermined function of the mobile terminal according to the user state information. According to the method, functions of the mobile terminal may be controlled without direct inputs from the user.

Features and operations of the mobile terminal will now be described in connection with FIG. 1. FIG. 1 is a block diagram of the mobile terminal, according to an embodiment of the present invention. The mobile terminal may be a smartphone, a cell phone, a game console, a television, a display device, a vehicle head unit, a notebook, a laptop, a tablet Personal Computer (PC), a Personal Media Player (PMP), a Personal Digital Assistant (PDA), or the like.

Referring to FIG. 1, the mobile terminal mainly includes an image input unit 100, an image processor 105, a controller 120, a memory 130, a display unit 140, and a communication unit 150. Other components such as a microphone may be further included in the mobile terminal, but the following description will only describe the components in connection with an embodiment of the present invention.

The image input unit 100 equipped on the front face of the mobile terminal faces a user and serves to capture the face of the user. The image input unit 100 may be, e.g., a camera including a lens system, an image sensor, a flash, etc. The user may capture a video image or a still image through the image input unit 100, and an image whose front is captured or in which the user is captured is delivered to the image processor 105 in an image signal. In processing an image frame that constitutes a still image or a video image, the image signal output by the image sensor comprised of a plurality of pixels arranged in an M×N matrix corresponds to a set of voltages, i.e., a set of pixel values, output from the pixels. The image signal output from the image input unit 100 represents a single frame, i.e., a still image. The frame is comprised of M×N pixels. The image sensor may be a Charge-Coupled Device (CCD) image sensor, Complementary Metal-Oxide Semiconductor (CMOS) image sensor, etc.

An image captured by the image input unit 100 is, in general, displayed on the display unit 140 for preview, but in the embodiment of the present invention where a specific function or a specific application of the mobile terminal is intelligently controlled by using face detection results or eye detection results, while the specific function or the specific application is being activated by the user, the input image may not be displayed on the display unit 140. Thus, even though the user does not recognize himself/herself being captured, an intuitive input for controlling the mobile terminal may be made by the user adjusting a distance between the mobile terminal and the user, an eye size, or the like.

The image processor 105 performs face recognition on the captured image by processing the image in frame units. The face recognition may be applied not only to still images like a photograph but also to video images. For example, in the case of videos, the videos are comprised of consecutive still image frames and so the still image frames may be used in the face recognition.

The image processor 105 extracts and recognizes a face image if the face image is included in the input image, or performs recognition by detecting eyes if the face image is not included in the input image. To do so, the image processor 105 mainly includes a face detector 110 and an eye detector 115. Operations of the face detector 110 will be described in detail later.

The face recognition is performed based on a face recognition algorithm contained in the mobile terminal, and uses a method of identifying the face by using contour information about the entire face of an object or uses a face extraction technology that uses color and/or texture of facial skin, templates, and/or the like. For example, the image processor 105 may perform face learning with numerous face images, and may detect a face image from input image frames based on accumulated face learning data.

Furthermore, eye detection is based on an eye recognition algorithm, and in general, an eye is detected after face detection in a restricted part of a detected face area. Using both eyes in the input area may also be used to detect the eye. In particular, in an embodiment of the present invention, if a face is not detected in the input image, a method of performing eye detection is used within the entire input image or in a predetermined area of interest.

The memory 130 stores an operating system of the mobile terminal, various applications, information, data, or files input to the mobile terminal, and information, data, or files created in the mobile terminal. For example, the memory 130 stores images such as photos, videos, or the like, and the face recognition algorithm to recognize the face of an object, which is captured by the image input unit 100, and data to be used in the face recognition. For example, the memory 130 may store information about faces to be used in the face detection, and facial feature information of each user, which is registered in advance to be used in the face recognition. The face information stored in the memory 130 to be used in the face recognition may be learned and updated by repetitive face recognition.

The display unit 140 displays images based on image signals input from the controller 120 and delivers received user input data to the controller 120. The display unit 140 includes a display part, such as a Liquid Crystal Display (LCD), Organic Light Emitting Diodes (OLEDs), or LEDs, and a touch panel arranged under or on top of the display part. The touch panel detects user inputs. When a user input means (e.g., a finger, a stylus pen, etc.) presses the surface of the display part, the touch panel outputs a detection signal (or a touch detection signal) that has information about input positions (or coordinates) and/or input states (e.g., mouse down, mouse up, mouse movement, etc.). For example, the user runs applications related to various executable items by touching the items displayed on a screen (i.e., the surface) of the display unit 140. The display unit 140 is a means for receiving user inputs and for outputting screens related to applications, such as a camera application or a video communication application. In an embodiment of the present invention, the display unit 140 uses the touchscreen as an example, but the display unit 140 may also be configured only with the display part.

The communication unit 150 transmits messages, data, and/or files created by the controller 120 through a wired line connection or wirelessly, or delivers messages, data, and/or files received through the wired line connection or wirelessly to the controller 120.

The sensor unit 160 detects a position, a direction, or movement of the mobile terminal, and may be implemented with an inertial sensor, such as an accelerometer, a gyroscope, a shock sensor, or a tilt sensor, an altimeter, a gravity sensor, a geomagnetic sensor, or a combination of them. The present invention is not limited thereto, but the sensor unit 160 may also be implemented with a different type of sensor that may detect rotational direction, movement direction, or tilting level.

The speaker 170 outputs a sound signal (or voice data) input from the controller 120 to the air, and specifically, outputs the sound signal by making stereo sounds to the left or the right according to a face direction under control of the controller 120. Alternately, the sound signal is output with different volume according to an eye size under control of the controller 120.

The controller 120 is a Central Processing Unit (CPU), which controls general operations of the mobile terminal and serves to implement the method of controlling functions of the mobile terminal based on analysis of the user's face. The controller 120 detects various user inputs received not only through the display unit 140 in the touch screen but also through the image input unit 100. The user input may include different forms of information entered into the image input unit 100, such as touches, user gestures, pupil movements, etc. The controller 120 controls predetermined operations or functions to be performed in the mobile terminal in response to the user inputs.

Specifically, the controller 120 estimates a size, a position, and an angle of the face or the eye using the face and/or eye detection results from the image processor 105. Accordingly, the controller 120 determines the user state information based on the face and/or eye detection results. The user state information includes at least one of the user's presence or absence, a direction of the user's face, a relative distance between the mobile terminal and the user, and/or a position of the user's face.

Specifically, the controller 120 determines the user's presence or absence based on whether the face or the eye has been detected in the input image, and estimates the relative distance between the mobile terminal and the user according to a percentage of the face or the eye in the screen, i.e., the face size or the eye size. The controller 120 also determines the direction and the position of the user's face by using an angle and position at which the face is detected e.g., among 0°, 90°, 180°, and 270°. The controller 120 may further determine the direction and the position of the user's face according to the eye position and angle even when the face has not been detected in the input image.

Subsequently, the controller 120 controls to perform a predetermined function according to the user state information. The predetermined function according to the user state information may be classified and described in the following embodiments.

In a first embodiment of the present invention, if a predetermined time has elapsed while the user is using the mobile terminal, the controller 120 turns the display unit 140 off and activates a screen lock mode. When the screen lock mode is activated, the controller 120 drives the image input unit 100 to capture what is in front of the mobile terminal, determines the user's presence or absence based on the face or eye detection results provided from the image processor 105, and controls to unlock the screen if it is determined that the user exists ahead of or in front of the mobile terminal. After that, even if the predetermined time has passed, the controller 120 keeps the display unit 140 on as long as the user's face is detected in the input image. In this case, no additional input, such as a particular key, a password, and/or a lock pattern is required for unlocking the screen, thereby increasing user convenience. Otherwise, if it is determined that the user does not exist ahead of the mobile terminal, the controller 120 maintains the screen lock mode.

As such, according to the first embodiment of the present invention, the controller 120 controls extension of screen lighting time and screen lock. For example, even when a user leaves his/her seat while watching a video, the video continues to be played until the user selects to pause the video. However, in the embodiment of the present invention, if it is determined that the user does not exist because a face or an eye has not been detected in the input image, the controller 120 may pause the video without need for a separate key input.

In a second embodiment of the present invention, the controller 120 drives the image input unit 100 upon detection of rotation of the mobile terminal through the sensor unit 160. Then, the image processor 105 determines the direction of the user's face using face and/or eye detection results provided. The controller 120 thus determines a direction in which to display the screen according to the direction of the user's face. In other words, even though the mobile terminal has been rotated, the direction in which to display the screen is determined preferentially based on the direction of the user's face and so the user may always see the screen in his/her direction. As such, according to the second embodiment of the present invention, a screen rotation function may be intelligently controlled.

In a third embodiment of the present invention, the controller 120 makes stereo sounds to the left or the right through the speaker 170 according to the direction of the user's face.

In a fourth embodiment of the present invention, in making video calls or playing a video, the controller 120 changes sound outputs according to the distance between the mobile terminal and the user estimated from the face size or the eye size.

According to the foregoing embodiments, while the user is using the mobile terminal, the user may control the mobile terminal intuitively without direct inputs and the mobile terminal controls itself intelligently.

Figure 2:
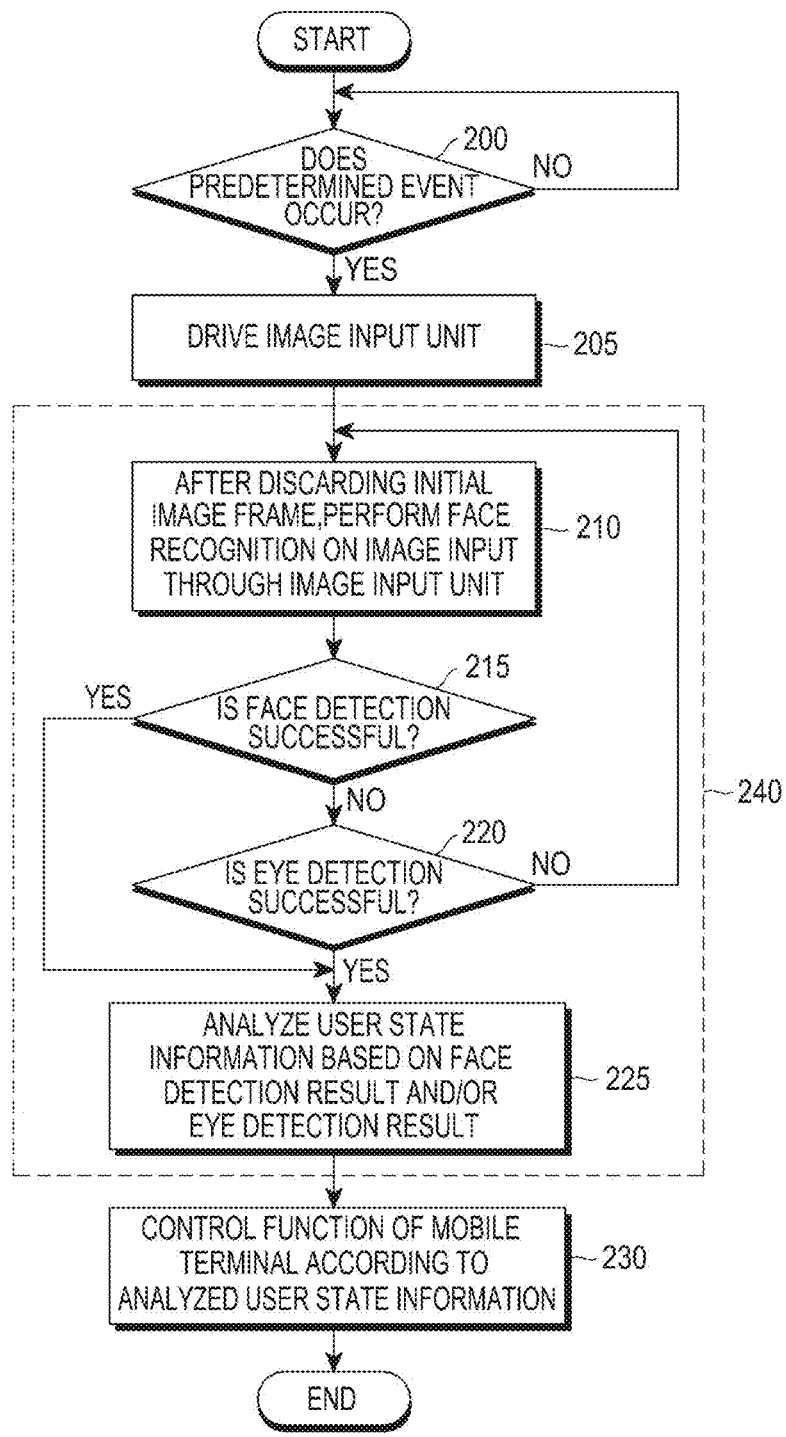
FIG. 2 is a flowchart of operations of the mobile terminal, according to an embodiment of the present invention.

FIG. 2 is a flowchart of operations of the mobile terminal, according to an embodiment of the present invention.

Referring to FIG. 2, if a predetermined event occurs, in step 200, the controller 120 drives the image input unit 100, in step 205. The predetermined event includes both changes in hardware and software of the mobile terminal, such as rotation or shaking of the mobile terminal, a lighting change, incoming calls, reception of text messages, and notifications made in smartphone applications.

Then, in step 210, the image processor 105 discards initial image frames input through the image input unit 100 and performs face recognition on subsequent input images. The initial images inputted after driving the image input unit 100 may be dark and out of focus because camera parameters including exposure, focus, white balance or the like have not been completely set for the surrounding environment, and it is thus desirable to skip at least one of the initial input images and use image frames after completion of the automatic settings.

If, in step 215, face recognition using the face recognition algorithm on the input image is successful, the method proceeds to step 225. Otherwise, in step 215, if the face recognition fails, the image processor 105 performs eye detection and determines if the eye detection is successful. If the eye detection fails, the method returns to step 210 where images are received again by the image input unit 100. If, in step 220, the eye detection is successful, or after successful face detection in step 215, the controller 120 analyzes the user state information based on the face detection results and/or the eye detection results provided from the image processor 105, in step 225. Specifically, the controller 120 determines, upon detection of a face or an eye in the input image, that the user exists, and analyzes a position and direction of the user's face looking at the mobile terminal, and a relative distance from the mobile terminal.

Next, in step 230, a function of the mobile terminal is controlled according to the analyzed user state information. For example, when the predetermined event, such as reception of a text message, occurs, to notify the user of the reception of the text message through the screen, the user needs to be looking at the screen. Thus, the controller 120 displays the text message on the display unit 140 if the face or the eye is detected.

Figure 3:
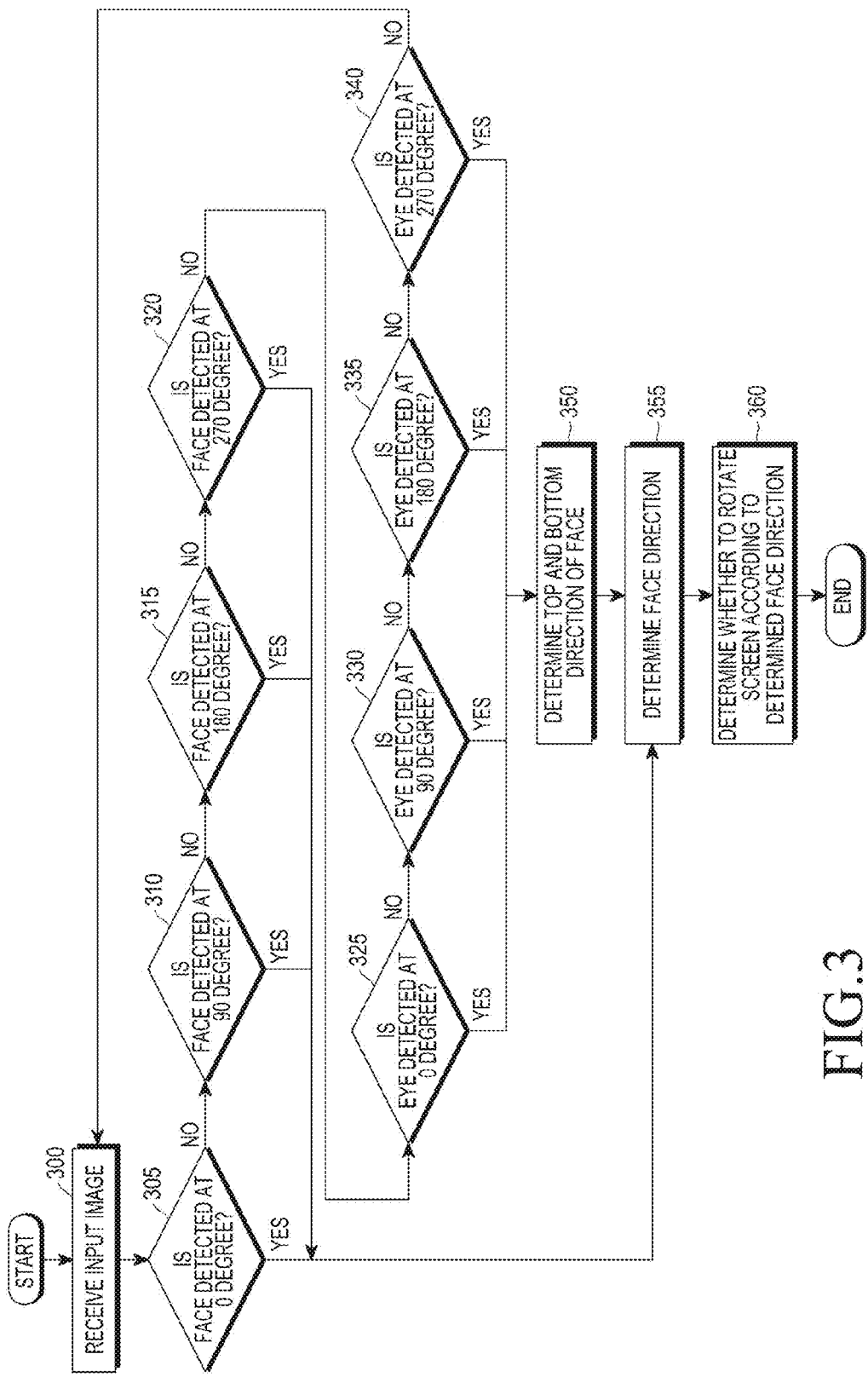
FIG. 3 is a flowchart of a detailed process of face and eye detection operations of the flow chart of FIG. 2.
Figure 4:
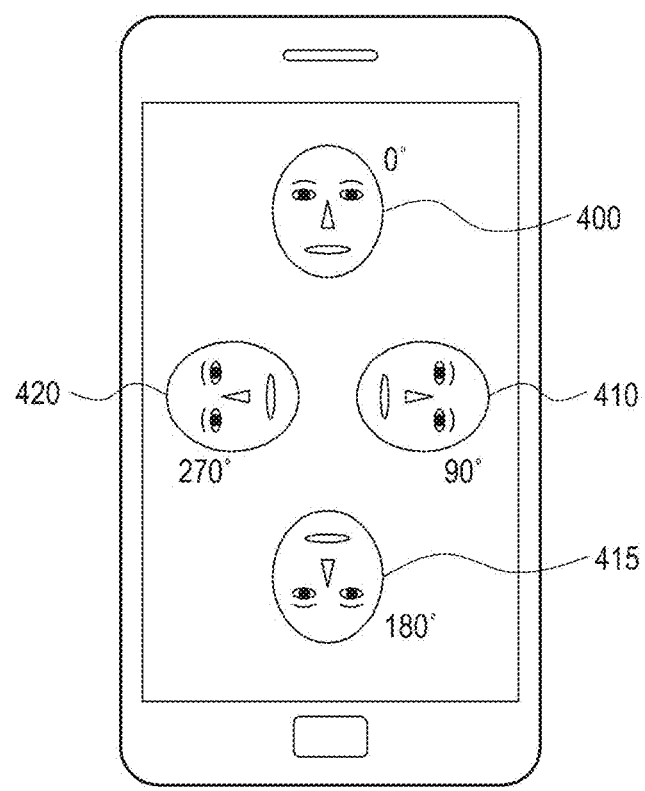
FIG. 4 illustrates a diagram for face detection in various directions, according to an embodiment of the present invention.

FIG. 3 is a flowchart of a detailed description of the steps for performing the face recognition or the eye recognition, represented by a reference numeral 240 of FIG. 2. That is, FIG. 3 shows a detailed procedure of the face detection and the eye detection of FIG. 2, and FIGS. 4 and 5 will be referred to for better understanding of the present invention. In general, since the mobile terminal is often used at one of 0°, 90°, 180°, and 270° angles, the user's face in the input image may be positioned at any of 0°, 90°, 180°, and 270° angles, as in FIG. 4, as represented by reference numerals 400, 410, 415, and 420, respectively.

Referring to FIG. 3, after receiving an input image in step 300, the image processor 105 performs steps 305 to 320 to determine if a face is detected at any of 0°, 90°, 180° and 270° angles. If the face is detected at any of 0°, 90°, 180° and 270° angles, the controller 120 determines a direction of the face based on the face detection results from the image processor 105, in step 355.

Figure 5:
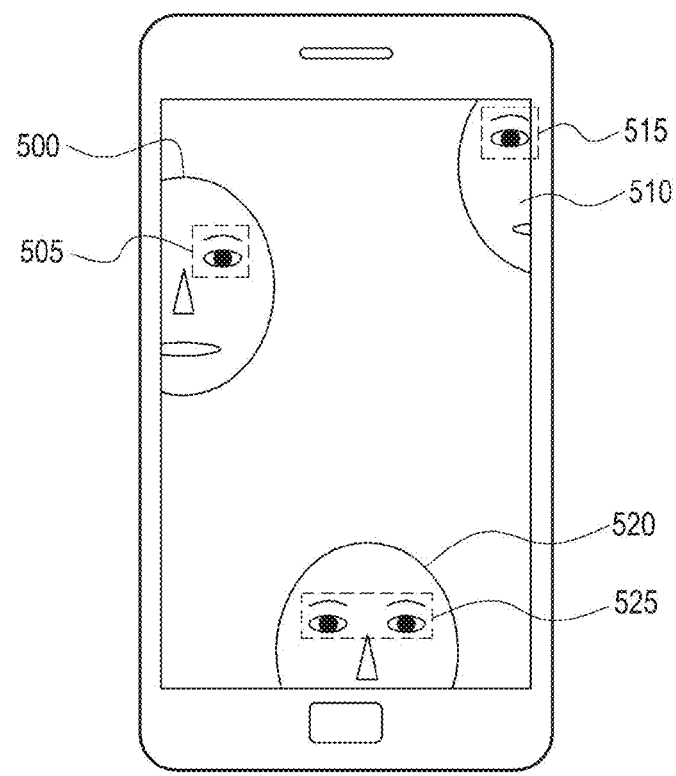
FIG. 5 illustrates a diagram for eye detection, according to an embodiment of the present invention.

Otherwise, if the face is not detected in any of steps 305 to 320, the image processor 105 performs steps 325 to 340 to determine if an eye is detected at any of 0°, 90°, 180°, and 270° angles. For example, even though the image input unit 100 is driven and starts capturing images, a screen of a currently running application is output instead of a preview screen and thus, the user is not aware that he/she is being captured and ends up being located out of a proper capture range of the image input unit 100. Therefore, as illustrated in FIG. 5, only a part of the face 500, 510, or 520 may be captured.

In this case, even if the face detection in the input image has failed, it is possible to detect an eye 505, 515, or 525. In this regard, as shown in FIG. 5, an image 520 having both eyes 525 may be captured, or images 500 and 510 having a single eye 505 or 515 may be captured. The present invention provides a method of performing eye detection on images having both eyes as well as a single eye.

The eye detection method will be described below. Upon detection of an eye at any of 0°, 90°, 180°, and 270° angles, the controller 120 determines the top or bottom direction of the face, in step 350. Then, in step 355, the face direction is determined, and in step 360, whether to rotate the screen according to the determined face direction is determined. For example, if the user's face is detected at an angle of 180°, which is represented by reference numeral 415 in FIG. 4, the user is positioned upside down on the mobile terminal and the screen of the mobile terminal is seen upside down from the user. According to an embodiment of the present invention, the screen of the mobile terminal may be rotated in the direction in which the user's face was detected. That is, the screen of the mobile terminal is rotated and displayed in the direction of the user's face.

On the other hand, eye detection is performed using the following method that uses skin color, eye templates, or the like. In particular, the embodiment of the present invention provides a method of performing eye detection on input images having both eyes as well as a single eye.

Specifically, the image processor 105 performs eye detection on the entire input image or on a predetermined area of interest. In this regard, to slow down the eye detection speed, local eye detection may be performed based on a position where an eye is detected, which is obtained from the previous image frame. Furthermore, skin color may be used to perform the eye detection, which will be described with reference to FIG. 6.

The image processor 105 detects one or more eye candidate areas with an eye recognition algorithm. For example, the eye candidate areas are detected by extracting closed curves that may be eye candidates through a process of e.g., digitizing the input image, or by using a characteristic in that the color of an eye, even for Caucasians having eyes without black pupils, tends to come in charcoal in the input image. By doing so, one or more eye candidate areas may be detected compared with general eye detection performed on a detected face area, and some of the eye candidate areas may be far from an actual eye area.

Thus, in the embodiment of the present invention, in case the one or more eye candidate areas are detected through the eye recognition algorithm, an eye detection method that uses skin color is provided to eliminate incorrectly detected eye areas from among the detected eye candidate areas.

To implement the method, the image processor 105 calculates percentages of skin color areas and non-skin color areas by using values of Y, Cb, Cr of the detected one or more eye candidate areas, and performs eye detection using the percentages. Ranges of the values of Y, Cb, Cr corresponding to the skin color are determined based on predetermined thresholds Ty, B1, B2, R1, R2, and pixel values corresponding to Y, Cb, Cr that satisfy the following Equation (1) are determined to be in a skin color area.

(Y≥Ty)

and (B1<Cb<B2)

and (R1<Cr<R2)    Equation (1)

The predetermined thresholds may vary depending on the surrounding environment, such as ethnic groups, lighting conditions and/or the like.

Figure 6:
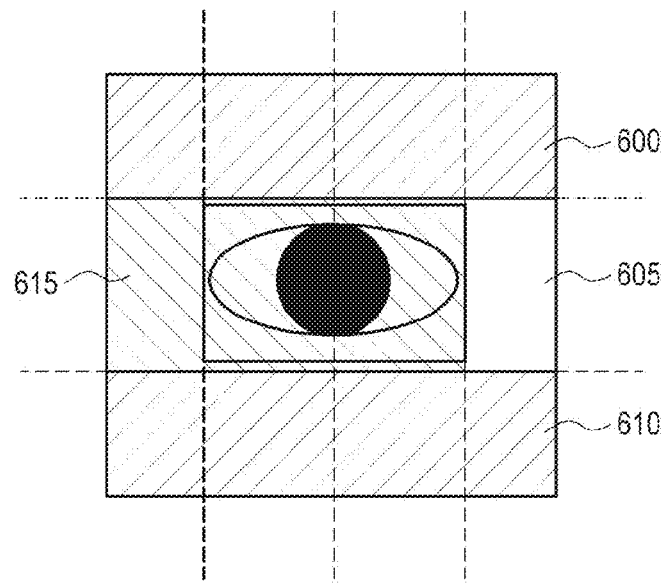
FIG. 6 illustrates a diagram for eye candidate area detection, according to an embodiment of the present invention.

Calculation of the percentages of skin color areas and non-skin color areas are illustrated in FIG. 6. Referring to FIG. 6, the eye detector 115 in the image processor 105 detects the eye candidate areas, and divides the detected eye candidate areas into three areas 600, 605, and 610 in the vertical direction and into four areas in the horizontal direction. Then, the image processor 105 calculates a proportion S of the skin color in areas 600 and 610, and calculates a proportion NS of the non-skin color in shaded parts of the middle area 605, i.e., ¼ to ¾ parts 615 of the area 605. Pixel values corresponding to the skin color are determined using values of Y, Cb, Cr of the detected eye candidate areas with the requirements represented by Equation (1).

Once the proportions of the skin color S and the non-skin color NS in the eye candidate areas are obtained as described above, the proportions of the skin color S and the non-skin color NS are compared with predetermined thresholds Ts and Tn, respectively. If the comparison satisfies the following Equation (2), the eye detection is determined to be successful, or else, it is determined to be an incorrect detection.

(S>Ts)

and (NS>Tn)    Equation (2)

Thus, one of the one or more eye candidate areas that satisfies Equation (2) is finally determined as where the eye is detected. Using the method of eliminating incorrectly detected eye candidate areas facilitates easier eye detection in images having not only both eyes but also a single eye. Division of the eye candidate areas in horizontal and vertical directions is not limited to that as in FIG. 6.

For example, the image processor 105 may collect normal eye images and images frequently mistaken for eye images, perform eye learning on the collected images, and detect the eye in an input image based on eye learning data accumulated through the eye learning.

According to the embodiments of the present invention, even though the face is not detected as a whole, eye detection may indicate the user's presence, and direction of the user's face looking at the mobile terminal is estimated by sequentially performing eye detection on the input image at 0, 90, 180, and 270 degrees. Face detection is first performed in four directions (top, bottom, left, and right), and if a face is found, the face detection procedure is used to determine the direction of the user's face, or else if a face is not found, the eye detection procedure begins. Similar to the face detection, eye detection is performed in four directions and reduces an amount of calculation by using rotated images that have been used in the face detection. If the eye detection fails in any of the four directions, it is repeated until an eye is detected in a particular direction. The eye detection in the particular direction is followed by a procedure of determining the top and bottom direction of the face.

Unlike face detection, the eye detection procedure itself does not bring out information about the top and bottom direction of the face and thus an additional procedure to determine the top and bottom direction of the face is required even if a final eye area is determined from among the eye candidate areas. For example, in determining the eye direction, an image of surrounding areas of the final eye area is normalized for a detected single eye or both eyes, and the top and bottom of the face are determined using the normalized image. For example, the top and bottom of the face may be determined by detecting positions of the eye brows as well as eyes.

In the embodiments described above, a face is detected by scanning with learned information about the face in a particular size in an input image. However, in capturing an image with a camera, only a part of the face may appear at the edge of the input image due to a viewing angle or distance between the camera and the face.

Figure 7:
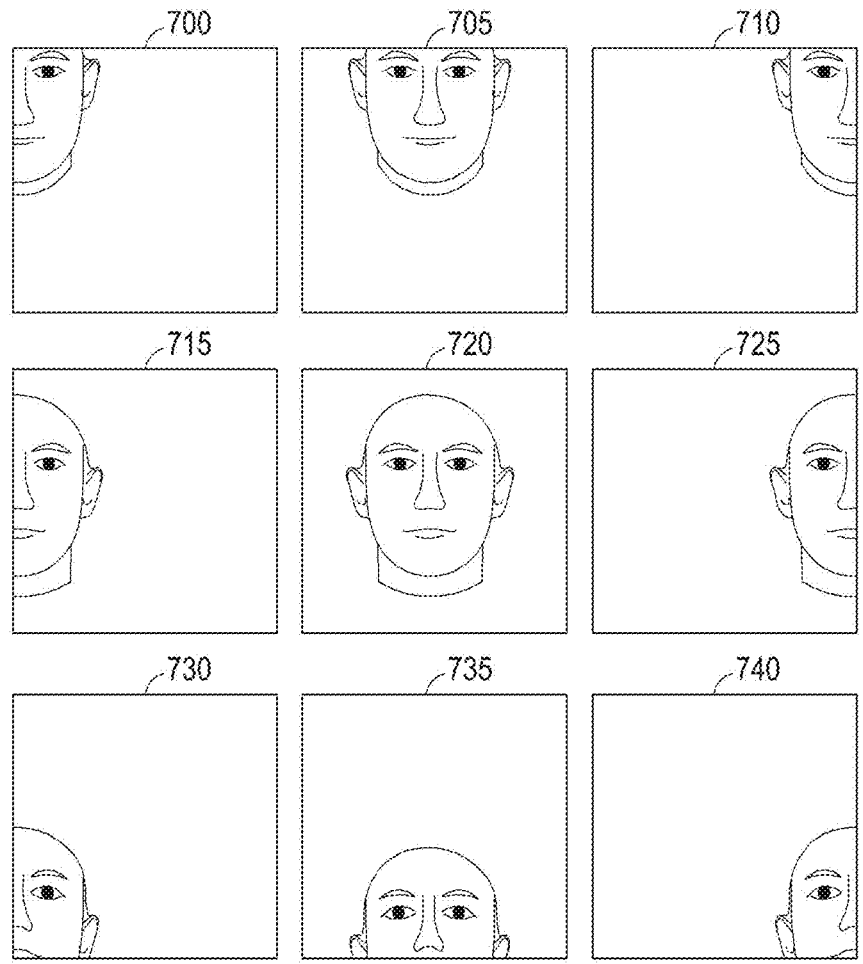
FIG. 7 illustrates possible face positions in input images, according to an embodiment of the present invention.

FIG. 7 illustrates possible face positions in input images. Referring to FIG. 7, there may be a face 700 existing at the upper left corner, a face 705 existing at the upper (top) edge, a face 710 existing at the upper right corner, a face 715 existing at the left edge, a face 720 existing in the center of the image, a face 725 existing at the right edge, a face 730 existing at the lower left corner, a face 735 existing at the lower (bottom) edge, or a face 740 existing at the lower right corner in an input image. That is, partial faces may exist at the upper, lower, left, right edges or at each corner of an input image.

In those cases where partial faces 700 to 740 exist (except 720 having the face in the center), the face is not detected. Since a face is generally detected by scanning an input image using a learned face image in a particular size, the partial face is not recognized from the input image. In the conventional technology, if a left face detector and a right face detector are separately used to detect a partial face, the input image has to contain a left or right face. In this case, the face detection rate noticeably drops because of low compatibility with the known face detector. Furthermore, it may be difficult to detect the parts of the face other than the left and right parts.

Therefore, in an embodiment of the present invention, if an image including a partial face is obtained, face detection will be performed in the following method.

Figure 8:
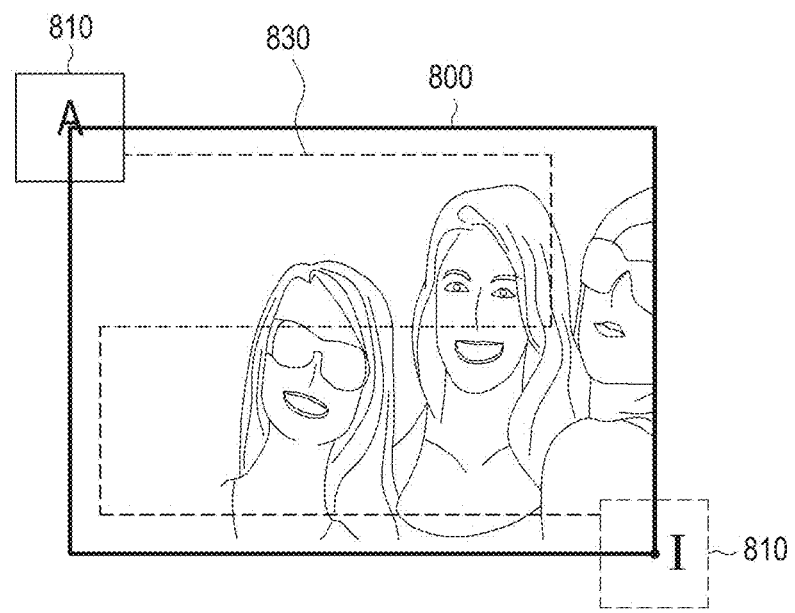
FIG. 8 illustrates an image frame explaining a scanning method using a face determination area, according to an embodiment of the present invention.

FIG. 8 illustrates an image frame explaining a scanning method using a face determination area.

Referring to FIG. 8, a course 830 along which to scan an image frame 800 using a face determination area 810 from the upper left corner A to the lower right corner I is illustrated. The face determination area 810 has a predetermined size and may be a pre-trained face detector. Referring to FIG. 8, in the image frame 800 including a plurality of face images, a face image that exists near an edge of the image frame 800 may be partially cut. In other words, partial faces are likely to appear at the edge of the image frame 800.

Considering this, the present invention provides a method of scanning the image frame 800 with the face determination area 810 partially deviating from the edge of the image frame 800.

Figure 9A:
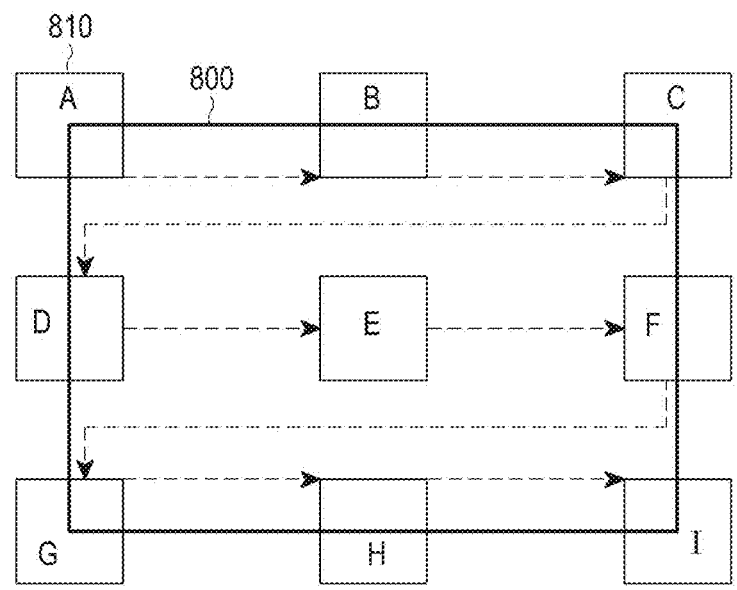
FIGS. 9A and 9B illustrate movement of a face determination area in a different scaled image frame, according to an embodiment of the present invention.
Figure 9B:
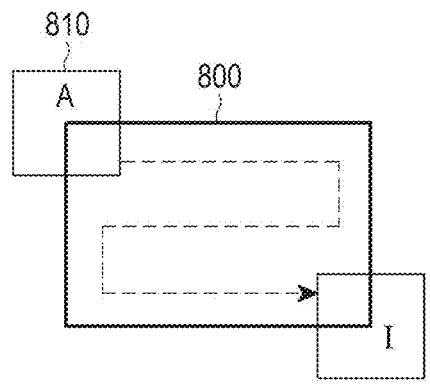

FIGS. 9A and 9B illustrate movements of the face determination area 810 in a different scaled image frame.

Referring to FIGS. 9A and 9B, the image frame 800 of FIG. 9A may be gradually scaled down to the image frame 800 of FIG. 9B. Since the face determination area 810 has a predetermined size, a face as small as the face determination area 810 contained in the image frame 800 of FIG. 9A may be detected with the face determination area 810, while a face as big as the face determination area 810 contained in the image frame 800 of FIG. 9B may be detected with the face determination area 810. The scale of each image frame 800 may be gradually changed.

Figure 10:
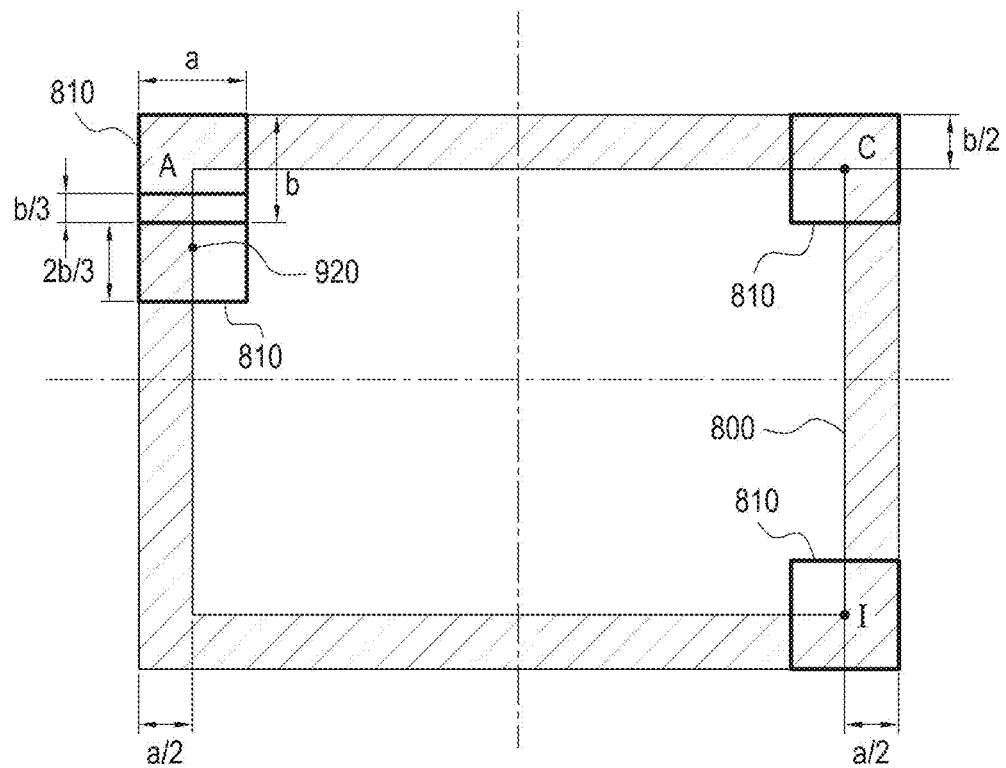
FIG. 10 illustrates positional relationships between a face determination area lying at the edges of an image frame and the image frame, according to an embodiment of the present invention.

FIG. 10 illustrates a positional relationship between the face determination area 810 at the edge of the image frame 800 and the image frame 800.

Referring to FIG. 10, a shaded area (hereinafter referred to as an additional area) surrounding the image frame 800 corresponds to an area in need to be corrected for face detection. A width and a height of the additional area are determined on the basis of the size of the face determination area 810. For example, assuming that the width of the face determination area 810 is a and the height is b, an initial position A of the face determination area 810 is the upper left corner of the image frame 800 where the center of the face determination area 810 falls on the vertex of the upper left corner. At the initial position A, a width of the additional area surrounding the left edge of the image frame 800 is determined such that one half of the width a/2 of the face determination area 810 is included in the image frame 800 while the other half of the width a/2 is included in the shaded area.

Similarly, a width of the additional area surrounding the left edge of the image frame 800 may be determined when the face determination area 810 is moved from the upper left corner in the horizontal direction and lies at the upper right corner C. Although, in the embodiment of the present invention, the width of the additional area is determined to be a/2 at the left and right edges, widths of the additional area at the left and right edges may vary based on settings and may also be determined to be different from each other.

A height of the shaded area surrounding the upper and lower edges of the image frame 800 is determined such that only one half of the height b/2 of the face determination area 810 is included in the image frame 800. Although, in the embodiment of the present invention, the height of the additional area is determined to be b/2 at the left and right edges, heights of the additional area at the upper and lower edges may vary based on settings and may also be determined to be different from each other.

Meanwhile, after the face determination area 810 is moved from the initial position at the upper left corner A, to the upper right corner C, the face determination area 810 is moved again to the left edge. The center of the face determination area 810 is moved accordingly to a position indicated by 920. In this position, the upper third of b of the face determination area 810 overlaps the face determination area 810 at the upper left corner A. For scanning, the face determination area 810 is moved until it reaches a final position, i.e., the lower right corner I.

Figure 11A:
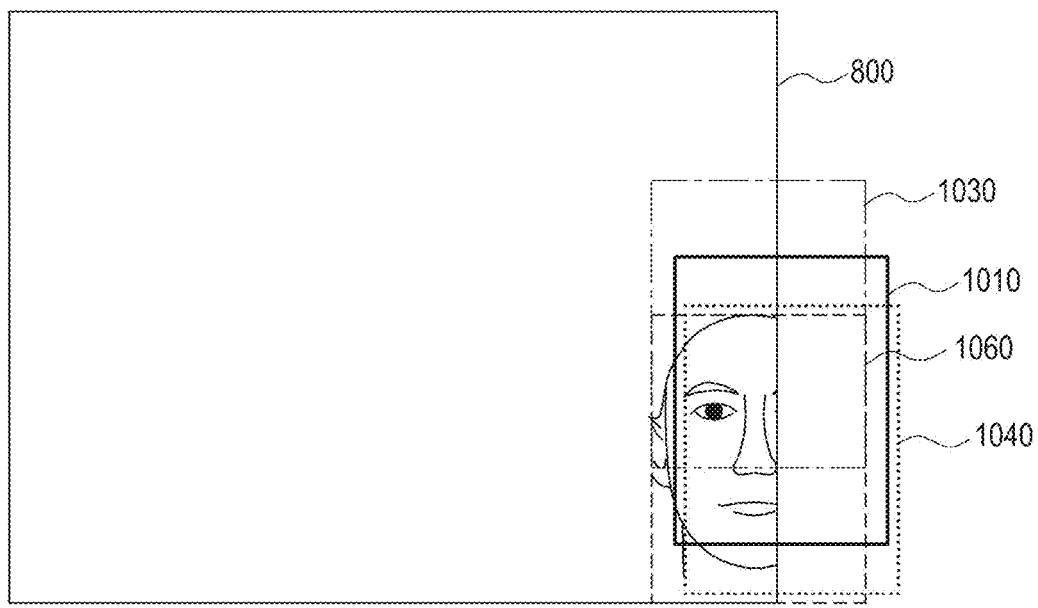
FIG. 11A illustrates an image frame in which a partial face image lies near the right edge of an image frame, according to an embodiment of the present invention.
Figure 11B:
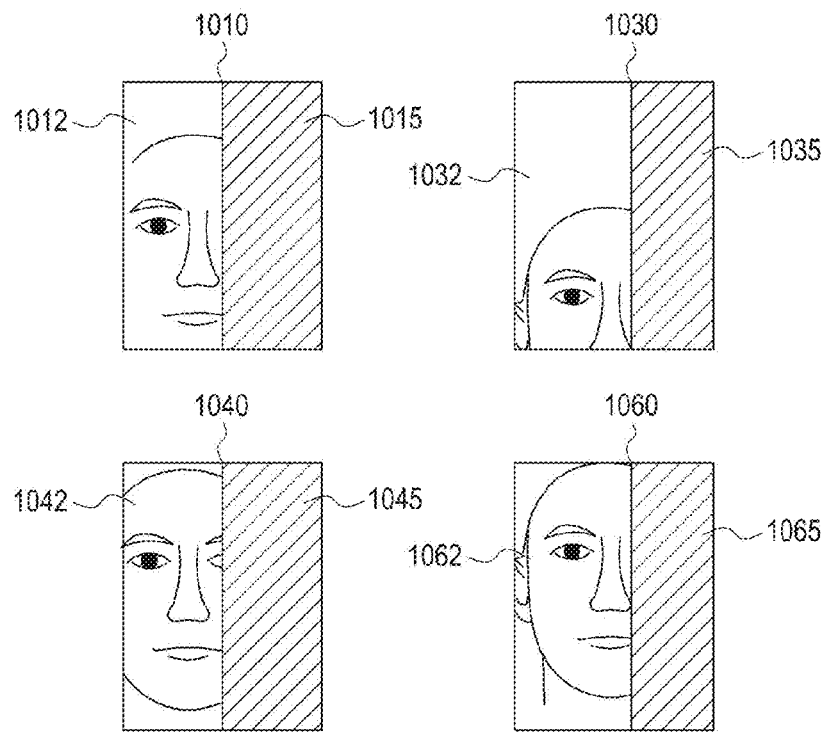
FIG. 11B illustrates face images included in a face determination area at different scanning positions, according to embodiments of the present invention.

FIG. 11A illustrates the image frame 800 in which a partial face exists at the right edge, and FIG. 11B illustrates face images included in the face determination area at different scanning positions.

Referring to FIG. 11A, if the face determination area lies at the right edge, part of the face determination area becomes empty. Different parts of a face, as shown in FIG. 11B, may be included at different scanning positions of the face determination areas 1010, 1030, 1040, and 1060 of FIG. 11A. Before performing face detection, each part 1012, 1032, 1042, or 1062 within respective face determination areas 1010, 1030, 1040, or 1060 is assumed to have a partial face and actually consists of corresponding pixels near the right edge of the image frame 800.

Each face determination area 1010, 1030, 1040, or 1060 may be represented as shown in FIG. 11B as the right edge of the image frame 800 is scanned using the face determination areas 1010, 1030, 1040, or 1060 as shown in FIG. 11A. Each face determination area 1010, 1030, 1040, or 1060 includes an area (also called 'a part') 1012, 1032, 1042, or 1062 which is filled with pixels and expected to have a partial face (hereinafter called an expected area), and an empty area (shaded area) 1015, 1035, 1045, or 1065.

In embodiments of the present invention, compensation of the empty areas 1015, 1035, 1045, or 1065 of each face determination area 1010, 1030, 1040, or 1060 is provided.

Figure 11C:
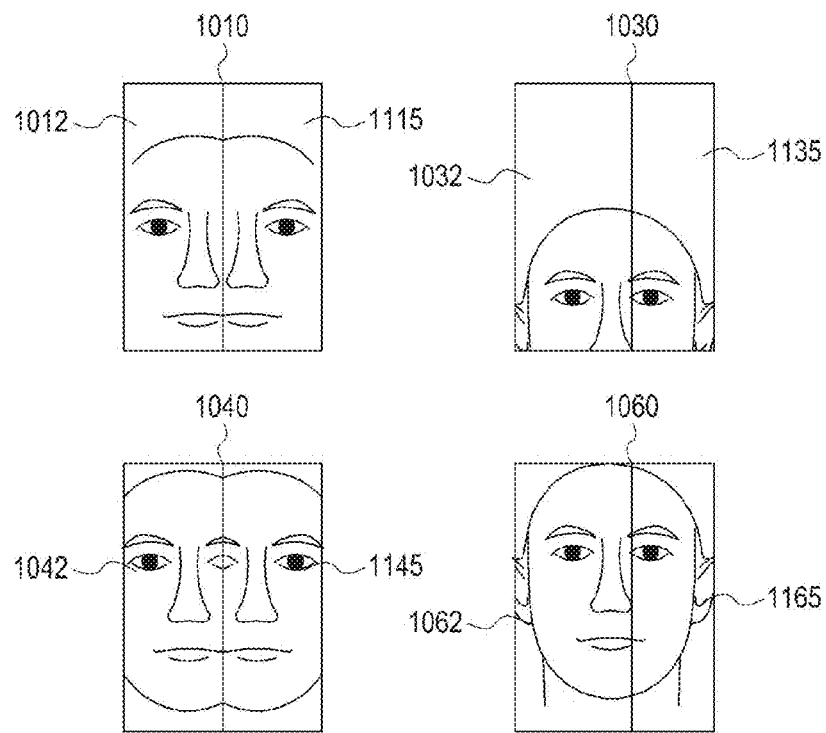
FIG. 11C illustrates images compensated by a mirroring method, according to embodiments of the present invention.

FIG. 11C illustrates images compensated by a mirroring method, according to embodiments of the present invention.

Referring to FIG. 11C, the empty area 1015, 1035, 1045, or 1065 of FIG. 11B is filled with pieces of pixel information of the partial face area 1012, 1032, 1042, or 1062 with a mirroring method. Accordingly, as shown in FIG. 11C, an opposite area 1115, 1135, 1145, or 1165 of each partial face area 1012, 1032, 1042, or 1062 is filled with the same pixel information as the partial face area 1012, 1032, 1042, or 1062. Alternatively, other methods, such as Modified Census Transform (MCT), Local Binary Pattern (LBP), etc., may be used to fill the opposite area 1115, 1135, 1145, or 1165. As the face determination area is compensated as described above after scanning the image frame 800 in the horizontal or vertical direction, compensated images may be obtained as shown in FIG. 11C. Among the compensated images, there may be an image from which to detect a face. Specifically, if a compensated image in which main facial features, such as the eyes, nose, mouth is arranged is obtained by mirroring, face detection from the compensated image 1060 may be successfully performed. Therefore, compared with the conventional face detection method, the present invention performs successful face detection even on a partial face.

Figure 12:
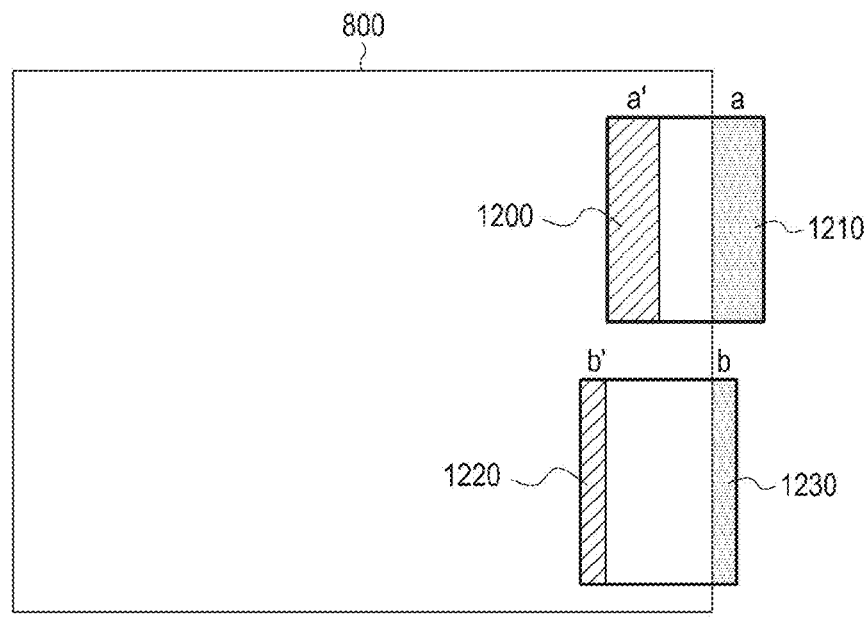
FIG. 12 is a diagram explaining a mirroring method, according to an embodiment of the present invention.

The mirroring method will be described in detail with reference to FIG. 12. Referring to FIG. 12, in the case where the face determination area lies across the edge of the image frame 800, an area a 1210 deviating from the edge is filled with the same image as a shaded area a' 1200 of the face determination area, i.e., the area a 1210 is compensated by mirroring. Similarly, an area b 1230 is compensated by mirroring the same image as a shaded area b' 1220.

The image compensation method is performed using the mirroring method for the left/right edge of the image frame 800 as in the foregoing embodiment. In another embodiment, the mirroring method may be applied to the upper/lower edge and the corner of the image frame 800.

Figure 13:
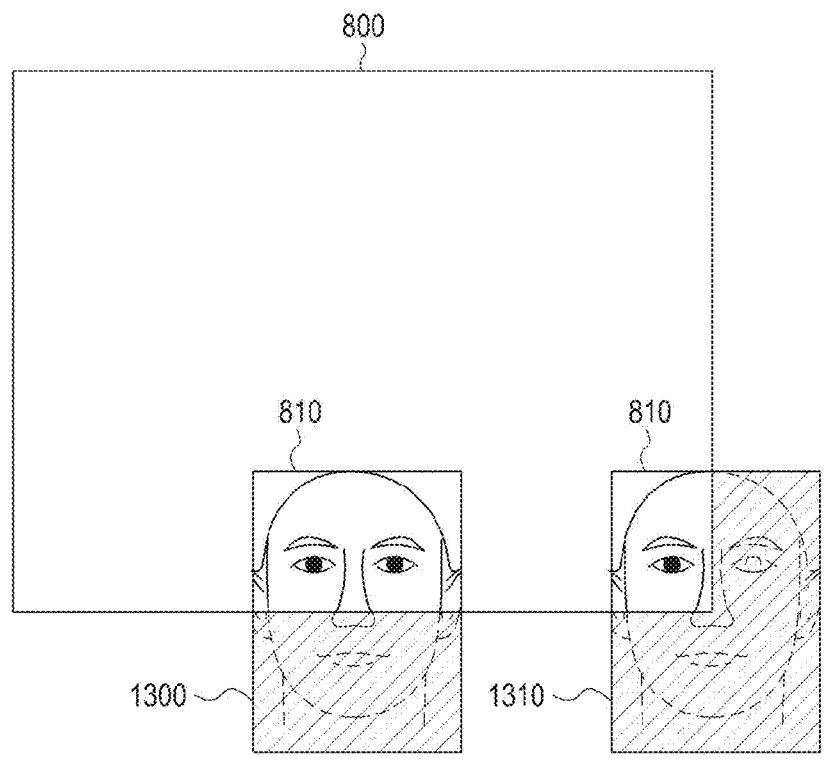
FIG. 13 illustrates an image frame in which a partial face lies at the bottom at on the bottom right corner, according to an embodiment of the present invention.

FIG. 13 illustrates the image frame 800 in which a partial face lies at the lower edge or at the lower right corner, according to an embodiment of the present invention.

Referring to FIG. 13, where part of the face determination area 810 lies at the lower edge of the image frame 800, an area deviating from the lower edge (a shaded area) 1300 appears empty. Similarly, if part of the face determination area 810 lies at the lower right corner, there is an empty area 1310 included within the face determination area 810. For the upper and lower edges or the corners, an embodiment of the present invention provides a method to compensate an empty area of the face determination area 810 using a predetermined template. In another embodiment of the present invention, both the mirroring method and the template matching method may be employed to compensate the empty area of the face determination area 810 at the corner. Specifically, for the face determination area 810 at the lower right corner, as shown in FIG. 13, the empty area 1310 is filled with pixels that correspond to an eye part by mirroring the face determination area 810 with respect to the right edge of the image frame 810, and then is filled with a part of a template image by attaching the part, which is a facial part below the nose of the template image by means of the template matching method for an area below the right corner of the image frame 810.

Figure 14:
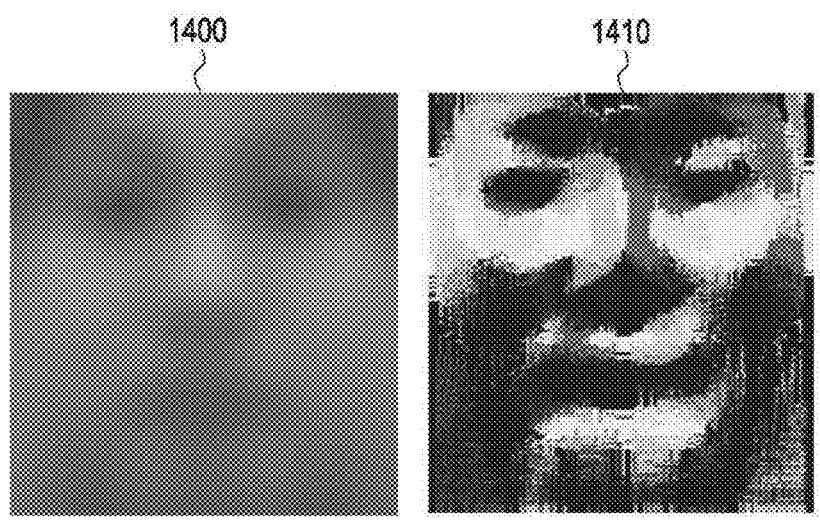
FIG. 14 illustrates predetermined face templates, according to an embodiment of the present invention.

FIG. 14 illustrates predetermined face templates 1400 and 1410. It is possible to compensate a facial area whose upper or lower part is cut away by compensating an empty area of the face determination area 810 using the predetermined face templates 1400 and 1410. As such, in an embodiment of the present invention, by applying either the mirroring method or the template matching method, or both, a partial face that lies at the edge may be detected, thus improving the face detection performance.

Figure 15:
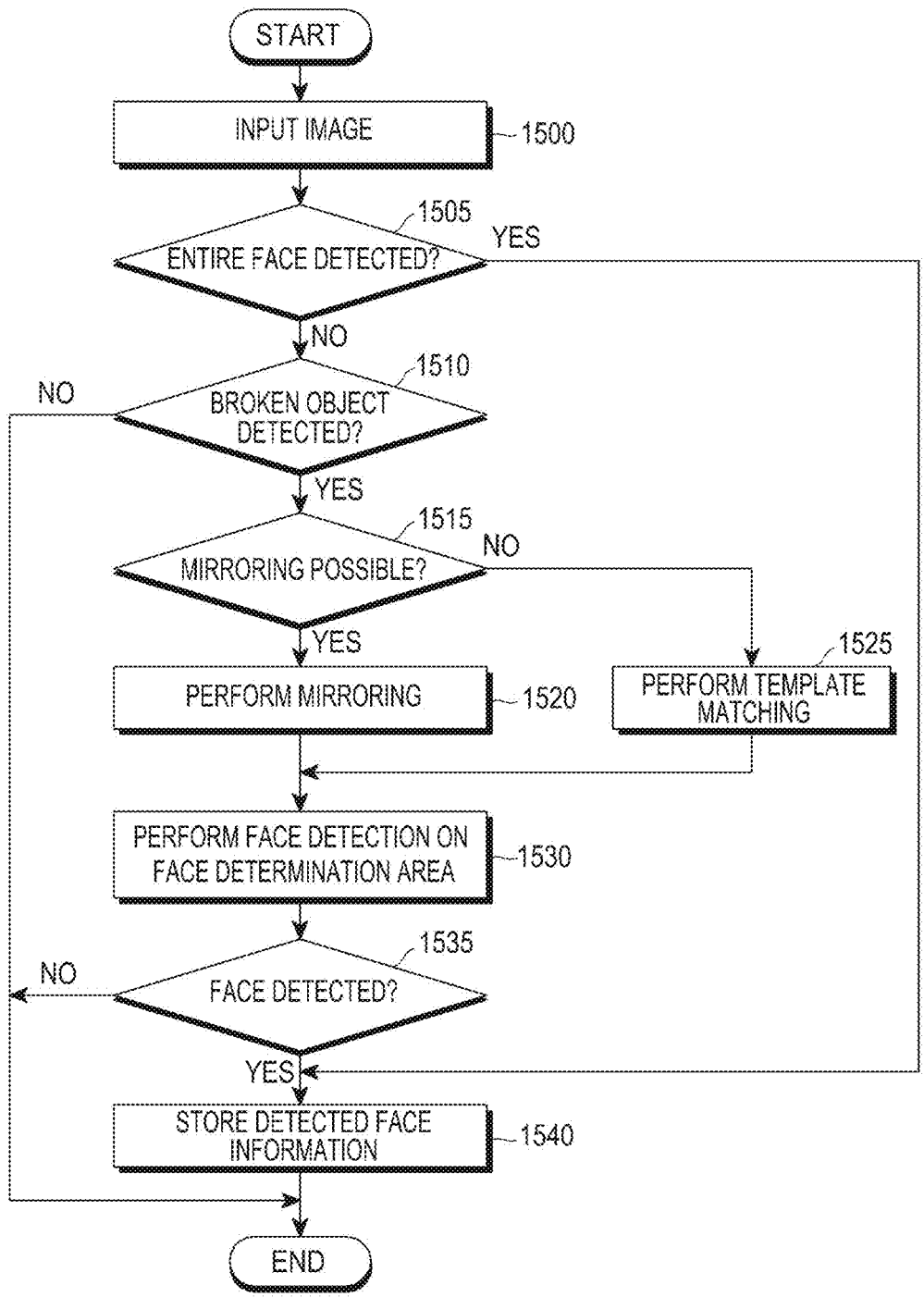
FIG. 15 is a flowchart of an image compensating method, according to an embodiment of the present invention.

FIG. 15 is a flowchart of an image compensating method, according to an embodiment of the present invention.

Referring to FIG. 15, the controller 120 receives an image frame from the image input unit 100 or reads out an image frame from the memory 130, in step 1500. Although the embodiment of the invention is applied to an image frame, the embodiment may be applied to each of sequentially input or read-out image frames. The embodiments of the present invention may also be applied to an image captured by a camera on the spot while a video call between two persons, or a multilateral video conference, is performed, or in any other application mode. Furthermore, although it is illustrated in FIG. 15 that the controller 120 controls the face detection operation, the face detection operation may, of course, be performed by the face detector 110.

In step 1505, the controller 120 determines whether an entire face is detected from an image frame. The entire face detection may be performed using a common face detection method in which face extraction technologies that use contour of a face, facial skin color and/or texture, templates, etc. may be employed. For example, the controller 120 may perform face learning with numerous face images, and may detect an entire face image from input image frames based on accumulated face learning data.

If the entire face is detected, the controller 120 stores facial information detected in step 1540. The facial information may be used to control, e.g., a predetermined function of a mobile terminal.

Otherwise, if the entire face is not detected, whether an object cut out from the image frame is detected is determined in step 1510. For example, if edge detection finds a discontinued edge line, it may be determined that there is a broken object. In this case, the broken object may be a partial face. Here, to detect a face, compensation should be performed for the additional area surrounding the edge of the image frame 800. If the broken object is not detected in step 1510, the face detection process ends.

If the broken object is detected in step 1510, the controller 120 determines whether mirroring is possible in step 1515. For example, the controller 120 may determine whether the face determination area lies at the left or right edge of the image frame 800, whether there is a symmetry axis for mirroring in the face determination area, such as a vertical axis based on the nose, and/or whether there is a part cut away from the symmetry axis.

If mirroring is possible, the controller 120 performs mirroring in the same way as described in connection with FIG. 12, in step 1520. Otherwise, if mirroring is not possible, the controller 120 performs template matching in step 1525. Subsequently, the controller 120 performs face detection on the face determination area in step 1530 that includes an area compensated by mirroring or template matching Such face detection on the face determination area is performed by applying a common face detection algorithm. Then, the controller 120 determines whether a face is detected from the face determination area, in step 1535. If facial information is included in the face determination area, the controller 120 detects the face and stores the facial information, in step 1540. Otherwise, if a face is not detected, the controller 120 ends the face detection process. To scan the image frame with the face determination area in the horizontal or vertical direction, steps 1510 to 1530 should be repetitively performed.

Depending on the size of a partial face and the extent to which the partial face appears in the screen, a step of adaptively determining validity of the partial face may further be applied. The step of determining validity of a partial face may be required, because if only the partial face including the mouth exists around the corner and even if the partial face is detected as the face, the face information might not be appropriate or sufficient to be used to control a function of the mobile terminal. In other words, the step of determining validity of a partial face may be performed to lessen the probability of wrong detection, taking into account vulnerability of the information of the partial face, and the step may be optionally added or excluded depending on applications.

Figure 16:
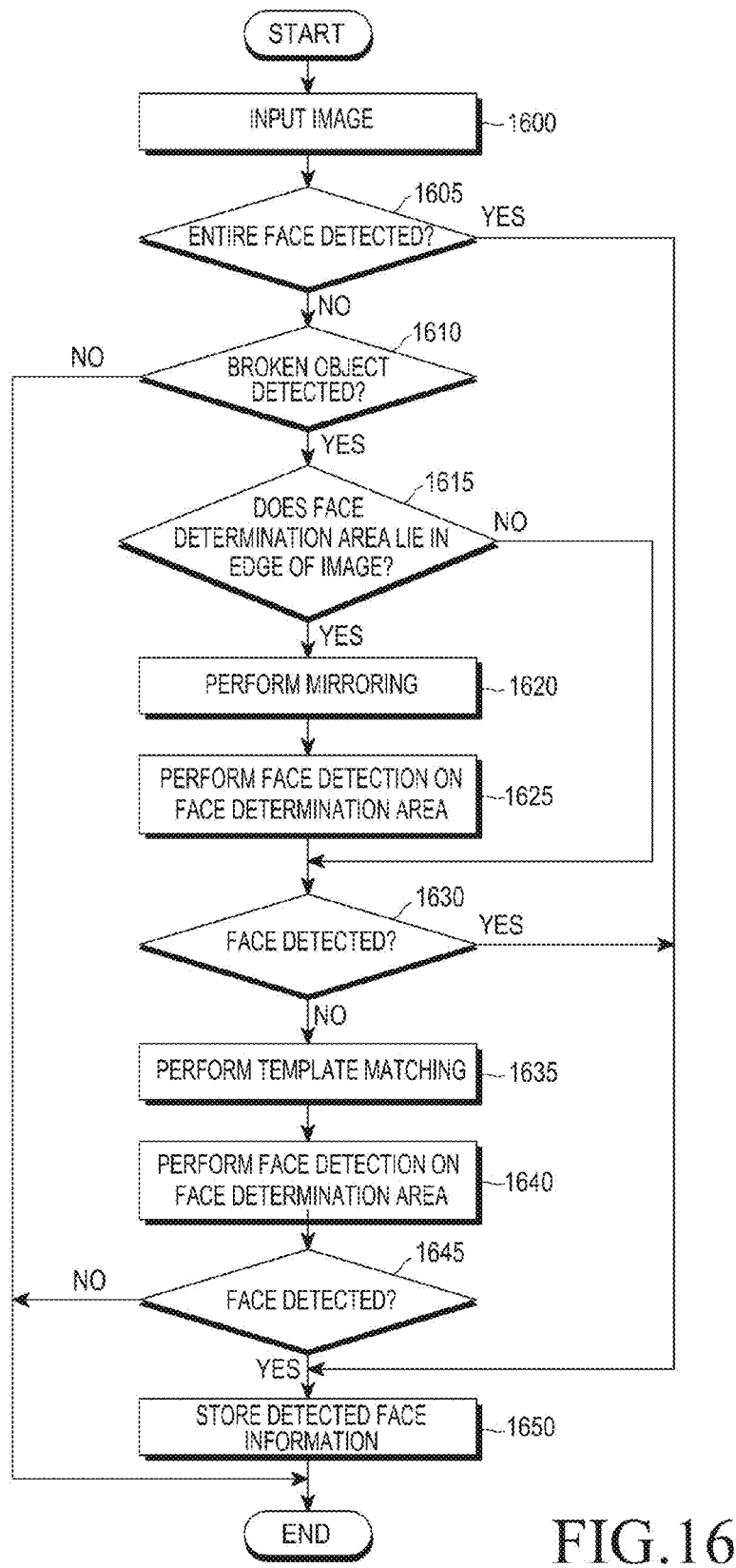
FIG. 16 is a flowchart of an image compensating method, according to another embodiment of the present invention.

FIG. 16 is a flowchart of an image compensating method, according to another embodiment of the present invention. Detailed descriptions of steps 1600 to 1610 will be omitted because they are the same as steps 1500 to 1510 of FIG. 15.

In step 1615, the controller 120 determines whether the face determination area lies at the edge of an image. If the face determination area lies at the edge of the image, mirroring is performed in step 1620 and face detection is performed on the face determination area that includes an area compensated by mirroring in step 1625. If the face determination area does not lie at the edge in step 1615, face detection is performed in step 1630. If a face is detected in step 1630, the detected face information is stored in step 1650. If a face is not detected in step 1630, template matching is further performed in step 1635. Subsequently, the controller 120 performs face detection on the face determination area that includes an area compensated by the template matching, in step 1640. By applying both mirroring and template matching for a corner of the image frame 800, efficient partial face detection may be performed. Detailed descriptions of steps 1645 and 1650 will also be omitted because they are the same as steps 1535 and 1540 of FIG. 15. Although, in FIG. 16, mirroring is followed by template matching, in other embodiments only one of mirroring or template matching may be applied or template matching may be followed by mirroring.

Figure 17:
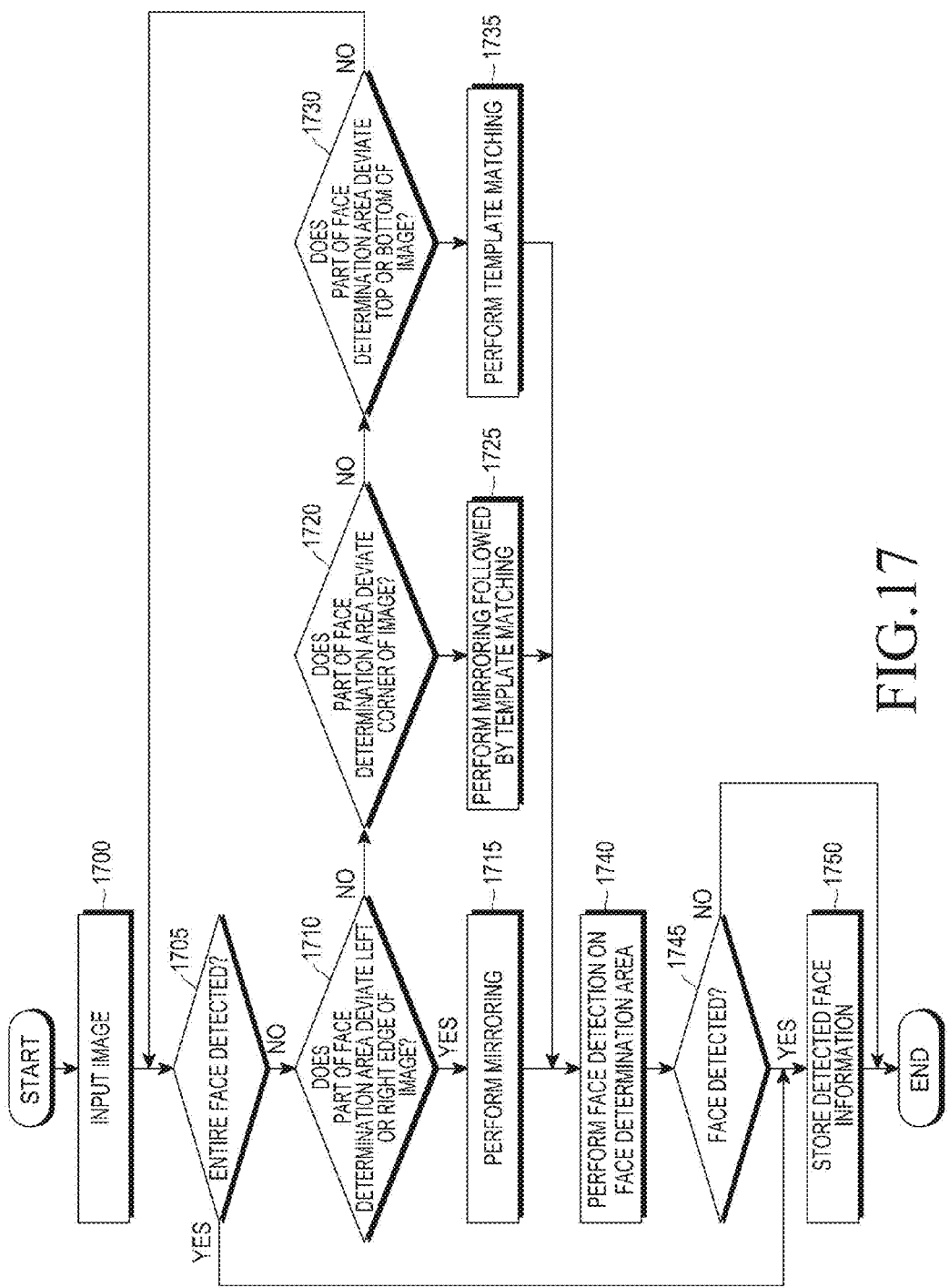
FIG. 17 is a flowchart of an image compensating method, according to another embodiment of the present invention.

FIG. 17 is a flowchart of an image compensating method, according to another embodiment of the present invention.

Referring to FIG. 17, detailed descriptions of steps 1700 and 1705 will be omitted because they are the same as steps 1500 and 1505 of FIG. 15.

In step 1710, the controller 120 determines whether part of the face determination area deviates from the left or right edge of an image frame. If part of the face determination area deviates from the left or right edge of an image frame, the controller 120 performs mirroring in step 1715 in the same way as performed in FIG. 12. Otherwise, if part of the face determination area does not deviate from left or right edge of an image frame, the controller 120 determines whether the face determination area deviates from a corner, e.g., the upper left corner or lower left corner of the image in step 1720. If part of the face determination area deviates from the corner, the controller 120 performs mirroring followed by template matching, in step 1725. Otherwise, if part of the face determination area does not deviate from the corner, e.g., the upper left corner or lower left corner of the image, the controller 120 determines whether part of the face determination area deviates from the top or bottom of the image in step 1730. If part of the face determination area deviates from the top or bottom of the image, the controller 120 performs template matching. If part of the face determination area does not deviate from the top or bottom of the image, the process returns to step 1705. Detailed descriptions of steps 1740 to 1750 will be omitted because they are the same as steps 1530 to 1540 of FIG. 15.

The foregoing descriptions have taken examples of using face detection or eye detection information in determining the direction of the user's face, but sensor information from the sensor unit 160 may also be used. For example, once the sensor unit 160 detects rotation of the mobile terminal, the rotation information, such as rotational direction, movement direction, and tilting level of the mobile terminal may be used. In this case, face detection may be performed on the input image not in all four directions as in FIG. 4, but in a particular direction with respect to the rotational direction of the mobile terminal. In this regard, if the mobile terminal is rotated while the user is looking at the screen thereof, face analysis results show that the direction of the user's face is not toward the front of the screen of the mobile terminal, and thus the display direction of the screen may need to be rotated to fit to the user's gaze. Otherwise, if the user does not rotate the mobile terminal but a face detection result shows that the direction of the user's face has been changed, the screen display direction may be changed to correspond to the direction of the user's face.

According to the present invention, the mobile terminal is controlled by intelligently controlling hardware and software through analysis of user states, such as the user's presence or absence, a distance between the mobile terminal and the user, and/or the like, rather than being controlled according to settings that the user establishes in advance, thereby increasing user convenience.

According to the present invention, face detection may be replaced by eye detection when the face detection fails, and eye detection information is used to determine the user's presence or absence, based on which lighting time and on/off of the screen of the display unit may be controlled and a function to pause the screen in video playback may also be provided to the user.

Furthermore, user convenience in using the mobile terminal may be increased by controlling the screen rotation intelligently by estimating the direction of the user's face toward the mobile terminal according to an improved method of controlling the mobile terminal compared with the conventional method, and providing services to intelligently control the volume of the mobile terminal according to a change in the eye size. Thus, the user may use the mobile terminal more conveniently and intuitively, thereby increasing the quality of user experience.

In addition, according to the present invention, a partial face, even appearing near an edge of an image, may be detected, thereby significantly reducing the possibility of false recognition, and thus providing the user with smoother functions that correspond to the face detection results.

It will be appreciated that the embodiments of the present invention may be implemented in a form of hardware, software, or a combination of hardware and software. The software may be stored as program instructions or computer readable codes executable on the processor on a computer-readable medium. Examples of the computer readable recording medium include magnetic storage media (e.g., ROM, floppy disks, hard disks, etc.), and optical recording media (e.g., CD-ROMs, or DVDs). The computer readable recording medium can also be distributed over network coupled computer systems so that the computer readable code is stored and executed in a distributed fashion. This media can be read by the computer, stored in the memory, and executed by the processor. The memory may be an example of the computer readable recording medium suitable for storing a program or programs having instructions that implement the embodiments of the present invention. Numerous modifications and adaptations will be readily apparent to those skilled in this art without departing from the spirit and scope of the present invention.

The mobile terminal may receive and store the program from a program provider by wired or wireless connections thereto. The program provider may include a program having instructions to perform the method of controlling the mobile terminal based on analysis of the user's face, a memory for storing information required for the method of controlling the mobile terminal based on analysis of the user's face, a communication unit for communicating by wire or wirelessly with the mobile terminal, and a controller for receiving a request from the mobile terminal and delivering corresponding programs to the mobile terminal.

While the present invention has been particularly shown and described with reference to certain embodiments thereof, it will be understood by those of ordinary skill in the art that various changes in form and details may be made therein without departing from the spirit and scope of the present invention as defined by the following claims.

What is claimed is:

1. An apparatus for controlling a mobile terminal based on analysis of a user's face, the apparatus comprising:
an image input unit;
an image processor configured to perform, upon reception of an input image through the image input unit, face detection on the input image and perform eye detection on the input image if the face detection fails; and
a controller configured to determine user state information based on face recognition results or eye recognition results from the image processor, and control to perform a predetermined function of the mobile terminal according to the user state information.

2. The apparatus of claim 1, wherein the user state information includes at least one of the user's presence or absence, a distance from the mobile terminal, and a position of the user's face.

3. The apparatus of claim 1, wherein the controller controls the mobile terminal based on the user's face analysis results which are characterized by driving the image input unit when a predetermined event occurs.

4. The apparatus of claim 3, wherein the controller drives the image input unit if a screen lock mode begins, unlocks the screen if it is determined from the recognition results on the input image from the image input unit that the user exists, and maintains the screen to be unlocked even if a predetermined time has elapsed, as long as it is determined that the user exists.

5. The apparatus of claim 1, wherein the image processor determines whether a face is detected in the input image with a face recognition algorithm, and performs eye detection on the input image with an eye recognition algorithm if the face detection fails.

6. The apparatus of claim 5, wherein the image processor detects one or more eye candidate areas with the eye recognition algorithm, and determines a final eye area from among the detected eye candidate areas according to an eye detection scheme that uses skin color.

7. The apparatus of claim 6, wherein the image processor divides the detected eye candidate areas into a predetermined number of areas in horizontal and vertical directions, calculates a proportion of skin color in areas divided in the vertical direction except for a middle area and a proportion of non-skin color in a portion of areas divided in the horizontal direction, and determines the areas to be the final eye area if the calculated proportions of the skin color and the non-skin color are greater than predetermined thresholds, respectively.

8. The apparatus of claim 6, wherein the image processor determines pixel values that correspond to the skin color by using values of luminance component Y, luma component Y' blue-difference chroma component $C_B$, and/or red-difference chroma component $C_R$ of the detected eye candidate areas.

9. The apparatus of claim 6, wherein the image processor determines, upon determination of the final eye area, top and bottom of the face by normalizing a surrounding area of the final eye area.

10. The apparatus of claim 1, wherein the image processor compensates a part of a face determination area that deviates from an edge of the input image using at least one of a mirroring method and a template matching method while the input image is scanned by moving the face determination area horizontally or vertically.

11. The apparatus of claim 10, wherein the image processor, if the face determination area moves to a position where a part of the face determination area deviates from a left or right edge of the input image, compensates the part by filling the part with pixel information of a part of the face determination area included in the image using the mirroring method and detects a partial face from the face determination area that includes the compensated part.

12. The apparatus of claim 10, wherein the image processor, if the face determination area moves to a position where a part of the face determination area deviates from an upper or lower edge of the input image, compensates the part by using the template matching method to attach an image resulting from the template matching to the part and detects a partial face from the face determination area that includes the compensated part.

13. The apparatus of claim 10, wherein the image processor, if the face determination area moves to a position where a part of the face determination area deviates from a corner of the input image, compensates the part by applying both the mirroring method and the template matching method and detects a partial face from the face determination area that includes the compensated part.

14. A method of controlling a function based on analysis of a user's face in a mobile terminal, the method comprising:
   driving, upon occurrence of a predetermined event, an image input unit of the mobile terminal;
   performing, upon reception of an input image through the image input unit, face detection on the input image;
   performing eye detection on the input image if the face detection fails;
   determining user state information based on face recognition results or eye recognition results; and
   performing a predetermined function of the mobile terminal according to the user state information.

15. The method of claim 14, wherein the user state information includes at least one of the user's presence or absence, a distance from the mobile terminal, and a position of the user's face.

16. The method of claim 14, wherein driving the image input unit comprises,
   driving the image input unit if a screen is changed to be locked.

17. The method of claim 16, wherein performing the predetermined function of the mobile terminal comprises
   unlocking the screen if it is determined from the recognition results that the user exists, and
   maintaining the screen to be unlocked as long as it is determined that the user exists.

18. The method of claim 14, wherein performing the eye detection comprises,
   detecting one or more eye candidate areas with an eye recognition algorithm; and
   determining a final eye area from among the eye candidate areas by using an eye detection scheme that uses skin color.

19. The method of claim 18, wherein the final eye area is determined by dividing the detected eye candidate areas into a predetermined number of areas in horizontal and vertical directions, calculating a proportion of skin color in areas divided in the vertical direction except for a middle area and a proportion of non-skin color in a portion of areas divided in the horizontal direction, and determining the areas to be the final eye area if the calculated proportions of the skin color and the non-skin color are greater than predetermined thresholds, respectively.

20. The method of claim 19, wherein pixel values corresponding to the skin color are determined by using values of luminance component Y, luma component Y' blue-difference chroma component $C_B$, and/or red-difference chroma component $C_R$ of the detected eye candidate areas.

21. The method of claim 14, further comprising:
   scanning the input image horizontally or vertically using a face determination area; and
   if the face determination area moves to a position where a part of the face determination area deviates from an edge of the input image, compensating a part of the face determination area that deviates from the edge of the input image using at least one of a mirroring method and a template matching method.

22. The method of claim 21, wherein performing face detection comprises:
   if the face determination area moves to a position where a part of the face determination area deviates from a left or right edge of the input image, compensating the part by filling the part with pixel information of a part of the face determination area included in the image using the mirroring method; and
   detecting a partial face from the face determination area that includes the compensated part.

23. The method of claim 21, wherein performing face detection comprises:
   if the face determination area moves to a position where a part of the face determination area deviates from an upper or lower edge of the input image, compensating the part by using the template matching method to attach an image resulting from the template matching to the part; and
   detecting a partial face from the face determination area that includes the compensated part.

24. The method of claim 21, wherein performing face detection comprises:
   if the face determination area moves to a position where a part of the face determination area deviates from a corner of the input image, compensating the part by applying both the mirroring method and the template matching method; and detecting a partial face from the face determination area that includes the compensated part.

* * * * *